United States Patent Office 3,078,155
Patented Feb. 19, 1963

3,078,155
METHOD OF COMBATTING WEEDS
Harry Tilles, El Cerrito, and Joe Antognini, Mountain View, Calif., assignors to Stauffer Chemical Company, a corporation of Delaware
No Drawing. Filed July 17, 1959, Ser. No. 827,729
4 Claims. (Cl. 71—2.7)

This invention relates to bis(dialkylcarbamoylthiomethyl) sulfides as novel chemical compounds and as herbicides. The compounds have the following general formula:

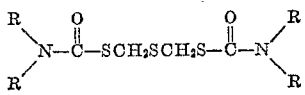

In the above formula R is a lower alkyl radical. Typical non-limiting examples of the compounds are (code numbers have been assigned to the compounds and are used hereafter):

R
CH$_3$ (R–2358)
C$_2$H$_5$ (R–2359)
n-C$_3$H$_7$ (R–2360)

Typical compounds can be made as follows:

EXAMPLE I (R–2358)

A 500 cc. 4 neck flask was provided with stirrer, thermometer, condenser and gas inlet tube. A solution of 10.4 g. (0.23 mole) of dimethylamine and 23.2 g. (0.23 mole) of triethylamine in 150 cc. of t-butyl alcohol was charged to the flask and then 21 g. (0.35 mole) of carbonyl sulfide was bubbled into the amine solution with rapid stirring, maintaining the temperature between 15–20° C. with ice cooling. 13.1 g. (0.10 mole) of bis-(chloromethyl) sulfide was added dropwise at 20° C. The reaction mixture was then heated to reflux over 1½ hours. After reflux was reached, 125 cc. of solvent was distilled, the residual slurry was cooled to room temperature, diluted with 200 cc. of petroleum ether, B.P. 30–60° C., and successively washed with 2 50-cc. portions of water, 2 50-cc. portions of 5% hydrochloric acid and 2 50-cc. portions of water. The organic phase was then dried over magnesium sulfate, filtered, and the filtrate concentrated on the steam bath. The residual liquid which remained soon crystallized. The solid was recrystallized from benzene-hexane solution, and dried in a vacuum oven at 60° C. There was obtained 8.4 g. (31.3% yield) of bis(dimethylcarbamoylthiomethyl) sulfide, M.P. 69–71° C.

Analysis.—Calcd. for C$_8$H$_{16}$N$_2$O$_2$S$_3$: N, 10.45%. Found: N, 10.34%.

EXAMPLE II (R–2359)

When the general procedure of Example I was repeated except that 16.8 g. (0.23 mole) of diethylamine, 23.2 g. (0.23 mole) of triethylamine, 21 g. (0.35 mole) of carbonyl sulfide, 13.1 g. (0.10 mole) of bis(chloromethyl) sulfide and 150 cc. of t-butyl alcohol were employed, there was obtained 15.3 g. (47.2% yield) of bis(diethylcarbamoylthio-methyl) sulfide. This product was a liquid, $n_D^{30}$ 1.5569.

Analysis.—Calcd. for C$_{12}$H$_{24}$N$_2$O$_2$S$_3$: N, 8.62%. Found: N, 8.36%.

EXAMPLE III (R–2360)

When the general procedure of Example I was repeated except that 23.2 g. (0.23 mole) of di-n-propylamine, 23.2 g. (0.23 mole) of triethylamine, 21 g. (0.35 mole) of carbonyl sulfide, 13.1 g. (0.10 mole) of bis-(chloromethyl) sulfide and 150 cc. of t-butyl alcohol were employed, there was obtained 27.5 g. (72.2% yield) of bis(di-n-propylcarbamoylthio-methyl) sulfide, $n_D^{30}$ 1.5399.

Analysis.—Calcd. for C$_{16}$H$_{32}$N$_2$O$_2$S$_3$: N, 7.35%. Found: N, 7.37%.

The compounds of the present invention have been tested as herbicides and found very effective as the following typical tests show. Some of the compounds are quite selective in their action and can be used to eradicate or control one type of plant, while another type of plant is relatively unaffected.

In making the following tests, seeds were planted in 3″ pots and shortly thereafter the compound under tests was applied to the pots in a drench at the rate of 365 pounds per acre. The pots were placed in a greenhouse and watered at suitable intervals and the germination and growth of the seeds was compared with similarly planted seeds to which no herbicide was added. In each case, germination (Ge.) was reported on the scale of 0–100%, while growth (Gr.) was reported on a scale of 0–10, based on the seeds which germinated. Thus, 100–10 indicates normal germination and normal growth.

| Compounds | Oats | | Cucumbers | | Radish | |
|---|---|---|---|---|---|---|
| | Ge. | Gr. | Ge. | Gr. | Ge. | Gr. |
| R–2358 | 0 | | 15 | 1 | 25 | 3 |
| R–2359 | 75 | 0+ | 100 | 5 | 100 | 3 |
| R–2360 | 50 | 1 | 100 | 6 | 100 | 8 |

The tests were then repeated using various application rates with the following results:

| Compound | Lbs./Acre | Peas | | Corn | | Radish | | Rye Grass and Oat | | Cucumber | |
|---|---|---|---|---|---|---|---|---|---|---|---|
| | | Ge. | Gr. | Ge. | Gr. | Ge. | Gr | Ge | Gr. | Ge. | Gr. |
| R–2358 | 10 | 0 | | 100 | 10 | 100 | 9 | 25 | 2 | 100 | 9 |
| | 40 | 0 | | 100 | 10 | 25 | 7 | 15 | 0+ | 50 | 7 |
| R–2359 | 10 | 100 | 9 | 100 | 10 | 100 | 9 | 15 | 1 | 25 | 7 |
| | 40 | 100 | 8 | 100 | 10 | 100 | 8 | 0 | | 25 | 3 |
| R–2360 | 10 | 100 | 10 | 100 | 10 | 100 | 10 | 25 | 0+ | 100 | 10 |
| | 40 | 100 | 10 | 100 | 10 | 100 | 10 | 25 | 0+ | 100 | 10 |

In addition, it has been found that the compounds, and particularly R–2360 are phytotoxic to wild oats but not to wheat.

The compounds of the present invention may be used as pre-emergence or post-emergence herbicides and may be applied in a variety of ways at various concentrations. They may be combined with suitable carriers and applied as dusts, sprays or drenches. The amount applied will depend on the nature of the seeds or plants to be controlled and the rate of application may vary from 1 to 500 pounds per acre. One particularly advantageous way of applying the compounds is as a narrow band along a row crop, straddling the row.

We claim:
1. The method of combatting weeds comprising applying a phytotoxic amount to the soil of a compound:

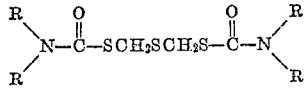

wherein each R is a lower alkyl radical.
2. The method of combatting weeds comprising applying a phytotoxic amount to the soil of the compound: bis(dimethylcarbamoylthio-methyl) sulfide.
3. The method of combatting weeds comprising applying a phytotoxic amount to the soil of the compound: bis(diethylcarbamoylthio-methyl) sulfide.

4. The method of combatting weeds comprising applying a phytotoxic amount to the soil of the compound: bis(di-n-propylcarbamoylthio-methyl) sulfide.

References Cited in the file of this patent

UNITED STATES PATENTS

| | | |
|---|---|---|
| 2,060,733 | Hunt et al. | Nov. 10, 1936 |
| 2,160,880 | Loane et al. | June 6, 1939 |
| 2,562,011 | Baumgartner | July 24, 1951 |
| 2,642,451 | Weijlard et al. | June 16, 1953 |
| 2,650,876 | Stewart | Sept. 1, 1953 |
| 2,687,348 | Kosmin | Aug. 24, 1954 |
| 2,852,361 | Lesslie | Sept. 16, 1958 |
| 2,901,500 | Tilles et al. | Aug. 25, 1959 |
| 2,910,497 | Meuly | Oct. 27, 1959 |
| 2,919,182 | Harman et al. | Dec. 29, 1959 |
| 2,987,541 | Bissinger et al. | June 6, 1961 |
| 2,989,393 | Tilles et al. | June 20, 1961 |
| 2,992,091 | Harman et al. | July 11, 1961 |

OTHER REFERENCES

Tilles: J.A.C.S., vol. 81, No. 3, February 1959 (July 1958 article), pages 714 to 729 (page 718 particularly relied on).